（12）United States Patent
Ramanathan et al.

(10) Patent No.: US 11,762,573 B2
(45) Date of Patent: Sep. 19, 2023

(54) PRESERVING LARGE PAGES OF MEMORY ACROSS LIVE MIGRATIONS OF WORKLOADS

(71) Applicant: VMware, Inc., Palo Alto, CA (US)

(72) Inventors: Arunachalam Ramanathan, Union City, CA (US); Yury Baskakov, Newton, MA (US); Anurekh Saxena, Newcastle, WA (US); Ying Yu, Bellevue, WA (US); Rajesh Venkatasubramanian, San Jose, CA (US); Michael Robert Stunes, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/990,564

(22) Filed: Nov. 18, 2022

(65) Prior Publication Data

US 2023/0082951 A1 Mar. 16, 2023

Related U.S. Application Data

(63) Continuation of application No. 17/384,469, filed on Jul. 23, 2021.

(51) Int. Cl.
*G06F 12/00* (2006.01)
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/0676* (2013.01); *G06F 3/0679* (2013.01); *G06F 9/45558* (2013.01); *G06F 2009/4557* (2013.01)

(58) Field of Classification Search
CPC .. G06F 3/0647; G06F 3/0604; G06F 9/45558; G06F 2009/4557
See application file for complete search history.

(56) References Cited

U.S. PATENT DOCUMENTS

| 9,176,675 | B1 | 11/2015 | Wang et al. |
| 10,522,266 | B2 | 12/2019 | Kuboshima et al. |
| 10,761,872 | B1 | 9/2020 | Lunev et al. |
| 2013/0205106 | A1 | 8/2013 | Tati et al. |
| 2013/0254500 | A1 | 9/2013 | Nakajima et al. |
| 2016/0170906 | A1* | 6/2016 | Baskakov ............. G06F 12/023 711/159 |
| 2016/0328304 | A1 | 11/2016 | Wark et al. |
| 2017/0090964 | A1* | 3/2017 | Tsirkin ................ G06F 9/45558 |
| 2018/0357092 | A1 | 12/2018 | Kaul |

FOREIGN PATENT DOCUMENTS

CN 111638938 A * 9/2020 ......... G06F 9/45558

* cited by examiner

*Primary Examiner* — John A Lane
(74) *Attorney, Agent, or Firm* — Kim & Stewart LLP (57) ABSTRACT

A method of preserving the contiguity of large pages of a workload during migration of the workload from a source host to a destination host includes the steps of: detecting at the destination host, receipt of a small page of zeros from the source host, wherein, at the source host, the small page is part of one of the large pages of the workload; and upon detecting the receipt of the small page of zeros, storing, at the destination host, all zeros in a small page that is part of one of the large pages of the workload.

20 Claims, 5 Drawing Sheets

PRESERVING LARGE PAGES OF MEMORY ACROSS LIVE MIGRATIONS OF WORKLOADS

CROSS-REFERENCE TO RELATED APPLICATIONS

This application is a continuation of U.S. patent application Ser. No. 17/384,469, filed Jul. 23, 2021, which is incorporated by reference herein.

BACKGROUND

In a virtualized computing system, a computing platform of a physical host may be encapsulated into virtual machines (VMs) running applications. A VM abstracts the processing, memory, storage, and the like of the computing platform for a guest operating system (OS) of the VM. Virtualization software on a host, also referred to as a "hypervisor," provides an execution environment for VMs, and a virtualization manager migrates VMs between hosts. Such migrations may be performed "live." i.e., while VMs are running. For such live migrations, one goal is to migrate VMs with minimal impact on performance.

Prior to a "switch-over" in which a VM is "quiesced" on a source host and resumed on a destination host, various operations are performed on the VM. Such operations include copying the state of the VM's memory from the source host to the destination host. However, until the VM is switched over to the destination host, the VM continues executing applications at the source host. During this execution, some of the memory of the source host that is copied to the destination host is later modified by the VM at the source host. As such, an iterative "pre-copying" phase may be used in which at a first iteration, all the VM's memory is copied from the source host to the destination host. Then, during each subsequent iteration, memory of the source host that has been modified is copied again to the destination host.

During the pre-copying phase, the VM's memory may be copied to the destination host in relatively small units. e.g., in 4-KB "pages." The use of small units reduces the amplification of "dirty" data by isolating the modifications made between iterations to smaller units of memory. For example, if a few modifications are made in a certain memory region, it is preferable to only retransmit a few 4-KB pages that contain the modifications than to retransmit an entire. e.g., 2-MB page that contains the modifications.

Although the VM's memory may be copied to the destination host in relatively small units, the hypervisors of the source and destination hosts may employ virtual memory spaces that divide memory into larger units. For example, the VM may employ a virtual address space that divides memory into "small" 4-KB pages. However, the hypervisors may employ separate virtual address spaces that divide memory into "large" 2-MB pages, each large page containing 512 contiguous 4-KB pages.

Use of large pages is generally advantageous for virtual memory system performance. For an application of a VM to touch system memory of the destination host, the application may issue an input/output operation (IO) to a virtual address of the VM, also referred to as a "guest virtual address." The guest virtual address may be translated into a physical memory address of system memory by "walking." i.e., traversing two sets of page tables that contain mapping information: a first set maintained by the VM and a second set maintained by the hypervisor. The page tables maintained by the hypervisor are referred to as "nested" page tables. To speed up translation, a translation lookaside buffer (TLB) may be utilized that contains beginning-to-end mappings of guest virtual addresses to physical memory addresses. However, such a TLB is limited in size and thus only contains some mappings, e.g., those of recently accessed guest virtual addresses. When an application requests to access memory at a guest virtual address for which the TLB contains no mapping, a "TLB miss" occurs, and the page tables must be walked. Use of relatively large pages minimizes the number of TLB misses and thus minimizes the number of expensive page-table walks.

When a VM is migrated to a destination host, the nested page tables of the destination host do not contain mappings from the VM's address space to physical memory addresses of the destination host. As such, in existing systems, once the VM resumes on the destination host and begins accessing memory at various virtual addresses, new mappings must be created on demand. If the hypervisor's virtual memory space at the source host is divided into large pages, it is advantageous for such large pages to be preserved at the destination host. In other words, a large page at the source host should also be mapped as a large page at the destination host with the same contiguous small memory pages at the same positions relative to the large pages. As a result, when large pages are preserved at the destination host, the virtual addresses of small pages may be mapped in place.

If the large pages are not preserved at the destination host, new large pages at the destination host need to be allocated to a VM, and the contents of each small page must be copied to a large page. Such a process requires significantly more CPU resources than mapping the small pages in place.

SUMMARY

Accordingly, one or more embodiments provide a method of preserving the contiguity of large pages of a workload during migration of the workload from a source host to a destination host. The method includes the steps of: detecting at the destination host, receipt of a small page of zeros from the source host, wherein, at the source host, the small page is part of one of the large pages of the workload; and upon detecting the receipt of the small page of zeros, storing, at the destination host, all zeros in a small page that is part of one of the large pages of the workload.

Further embodiments include a non-transitory computer-readable storage medium comprising instructions that cause a host to carry out the above method, as well as a computer system configured to carry out the above method.

DETAILED DESCRIPTION

Embodiments provide two new techniques for transferring memory pages of a workload that preserve the contiguity of those memory pages that are mapped as large pages. According to the first technique, when a small memory page of zeros is transferred from a source host to a destination host, the small memory page is stored at the destination host within the same large memory page of the workload as at the source host. According to the second technique, when a small page with contents modified at the source host is received at the destination host after the workload is resumed at the destination host, the small memory page with modified contents is stored at the destination host within the same large memory page of the workload as at the source host. By preserving large page contiguity on the destination host in this manner, the performance benefits associated with large pages will be maintained at the destination host. For example, preserving large pages and mapping small pages in place drastically reduces the downtime of a VM during migration.

Figure 1:
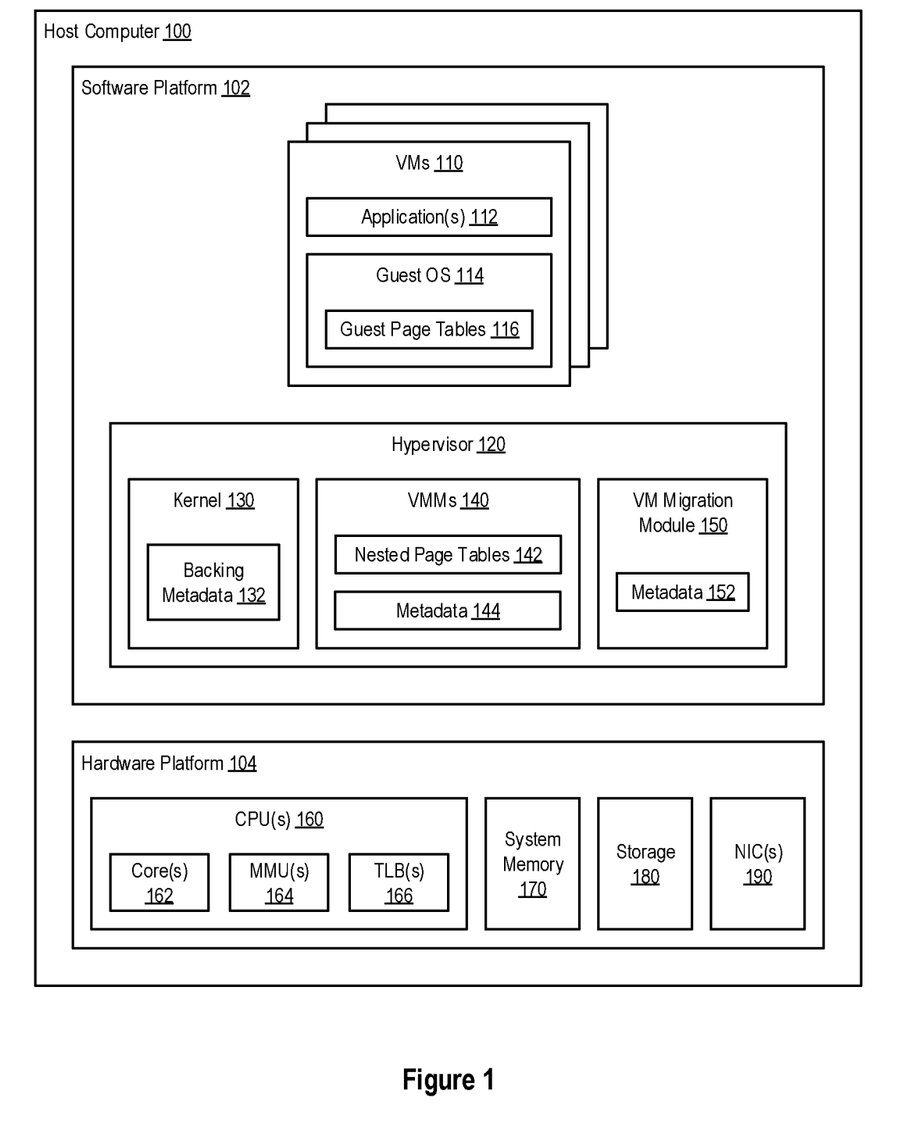
FIG. 1 is a block diagram of a host computer that may be used for a live migration of a VM, according to embodiments.

FIG. 1 is a block diagram of a host computer (also referred to as "host" for short) 100 that may be used for a live migration of a VM 110, according to embodiments. Host 100 may be a physical computer server constructed on a server grade hardware platform 104 such as an x86 architecture platform.

Hardware platform 104 includes conventional components of a computing device, such as one or more central processing units (CPUs) 160, system memory 170 such as random-access memory (RAM), optional local storage 180 such as one or more hard disk drives (HDDs) or solid-state drives (SSDs), and one or more network interface cards (NICs) 190. CPU(s) 160 are configured to execute instructions such as executable instructions that perform one or more operations described herein, which may be stored in system memory 170. Local storage 180 may also optionally be aggregated and provisioned as a virtual storage area network (vSAN). NIC(s) 190 enable host 100 to communicate with other devices over a physical network (not shown).

Each CPU 160 includes one or more cores 162, memory management units (MMUs) 164, and TLBs 166. Each core 162 is a microprocessor such as an x86 microprocessor. Each MMU 164 is a hardware unit that supports "paging" of system memory 170. Paging provides a virtual memory environment in which a virtual address space is divided into pages, each page being an individually addressable unit of memory. Each page further includes a plurality of separately addressable data words, each of which includes one or more bytes of data. Pages are identified by addresses referred to as "page numbers." CPU(s) 160 can support multiple page sizes including 4-KB, 2-MB, and 1-GB page sizes.

Page tables are arranged in a hierarchy that may include various levels. Each page table includes entries, each of which specifies control information and a reference to either another page table or to a memory page. The hierarchy and individual structures of page tables will be described further below in conjunction with FIG. 2A. In the example shown in FIG. 1, guest page tables 116 are used to translate guest virtual addresses to "guest physical page numbers" (PPNs), i.e., addresses that appear to be physical memory addresses from the perspective of a VM 110 but that are actually virtual addresses from the perspective of host computer 100. Nested page tables 142 are used to translate PPNs to machine page numbers (MPNs) of system memory 170. A guest OS 114 and hypervisor 120 expose their respective page tables to CPU(s) 160.

MMU(s) 164 traverse or "walk" the page tables to translate virtual page numbers to physical page numbers, from guest virtual addresses to PPNs using guest page tables 116 and from PPNs to MPNs using nested page tables 142. TLB(s) 166 are caches that store full address translations for MMU(s) 164 from guest virtual addresses to MPNs. A CPU 160 may contain an MMU 164 and a TLB 166 for each core 162. If valid and present, an MMU 164 obtains a translation from a guest virtual address to an MPN directly from a TLB 166. Otherwise, an MMU 164 traverses the page tables to obtain the translation.

Software platform 102 includes a hypervisor 120, which is a virtualization software layer that abstracts hardware resources of hardware platform 104 for concurrently running VMs 110. One example of a hypervisor 120 that may be used is a VMware ESXi™ hypervisor by VMware, Inc. Each VM 110 includes one or more applications 112 running on a guest OS 114 such as a Linux® distribution. Guest OS 114 maintains guest page tables 116 for each of the applications running thereon.

Hypervisor 120 includes a kernel 130, VM monitors (VMMs) 140, and a VM migration module 150. Kernel 130 provides OS functionalities such as file system, process creation and control, and process threads. Kernel 130 also provides CPU and memory scheduling across VMs 110, VMMs 140, and VM migration module 150. During migration of VM 110 to a destination host computer, kernel 130 of the destination host computer maintains backing metadata 132. Backing metadata 132 includes MPNs of system memory 170 at which migrated memory pages are stored, and associates these MPNs to PPNs of the migrated memory pages. Backing metadata 132 also includes flags indicating types and properties of such migrated memory pages, including whether such pages are backed by large pages and whether such pages are "remote" pages.

VMMs 140 implement the virtual system support needed to coordinate operations between VMs 110 and hypervisor 120. Each VMM 140 manages a virtual hardware platform for a corresponding VM 110. Such a virtual hardware platform includes emulated hardware such as virtual CPUs (vCPUs) and guest physical memory. Each VMM 140 also maintains nested page tables 142 for a corresponding VM 110, as discussed further below.

VM migration module 150 manages migrations of VMs 110 between host computer 100 and other host computers. VMMs 140 and VM migration module 150 include metadata 144 and 152, respectively, which are used for detecting modified memory pages during migration of VM 110 from host computer 100. Metadata 144 and 152 are described further below in conjunction with FIG. 4.

Figure 2A:
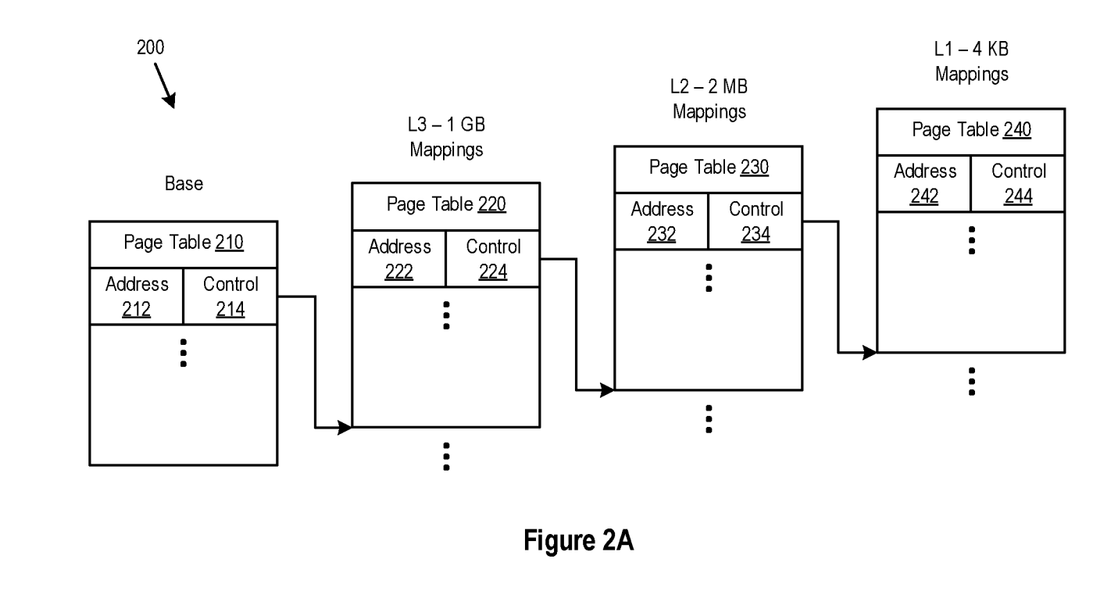
FIG. 2A is a block diagram of memory page tables in a page table hierarchy, according to embodiments.

FIG. 2A is a block diagram of memory page tables in a page table hierarchy 200, according to embodiments. In the embodiment of FIG. 2A, page table hierarchy 200 is a four-level hierarchy such as can be configured for use by CPU(s) 160 of FIG. 1. However, page table hierarchies may include more or less than four levels. Furthermore, page table hierarchy 200 could correspond to either of guest page tables 116 or nested page tables 142.

Page table hierarchy 200 includes a base page table 210, level 3 (L3) page tables 220, level 2 (L2) page tables 230, and level 1 (L1) page tables 240. L3 includes a number of page tables 220 corresponding to the number of page table entries (PTEs) in base page table 210, e.g., 512 L3 page tables 220. L2 includes a number of page tables 230 corresponding to the product of the number of PTEs per L3 page table 220 and the total number of L3 page tables 220, e.g., $512\times512=512^2$ L2 page tables 230. L1 includes a number of page tables 240 corresponding to the product of the number of PTEs per L2 page table 230 and the total number of L2 page tables 230, e.g., $512\times512^2=5123$ L1 page tables 240.

In the example of FIG. 2A, each PTE of L1 page tables 240 controls a 4-KB memory region, i.e., contains an address 242 that is either a PPN corresponding to a 4-KB VM memory page in the case of guest page tables 116 or an MPN corresponding to a 4-KB VM memory page in the case of nested page tables 142. Each PTE of the L2 page tables 230 controls a 2-MB memory region, i.e., contains an address 232 of an L1 page table 240 containing 512 4-KB PTEs. Each PTE of the L3 page tables 220 controls a 1-GB memory region, i.e., contains an address 222 of an L2 page table 230 containing 512 2-MB PTEs. As such, in the example of FIG. 2A, a virtual address space is divided into 4-KB pages. However, for example, in the case of a virtual address space that is divided into 2-MB pages, PTEs in the L2 page tables 230 may contain PPNs or MPNs corresponding to 2-MB VM memory pages. Furthermore, page table hierarchy 200 may also be configured with different page sizes at each level.

Each PTE of page table hierarchy 200 also includes various control bits. Control bits may include flags such as a "present" flag indicating whether a mapping is present, a "dirty" flag indicating whether a translation is performed in response to a write instruction, and a "PS" flag indicating whether a PTE maps to a page table or to a memory page. For example, the control bits 244 of PTEs in L1 page tables 240 may contain PS flags that are set, indicating that such PTEs contain either PPNs or MPNs. On other hand, the control bits 214, 224, and 234 of PTEs in base page table 210, L3 page tables 220, and L2 page tables 230 may contain PS flags that are unset, indicating that such PTEs contain addresses of other page tables.

Figure 2B:
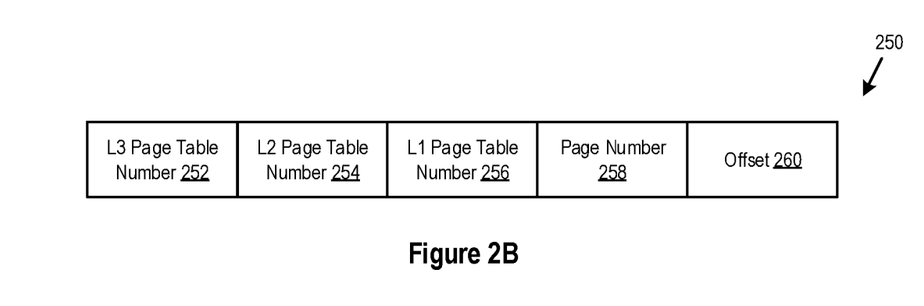
FIG. 2B is a block diagram illustrating an example of an address that may be used to walk memory page tables, according to embodiments.

FIG. 2B is a block diagram illustrating an example of an address 250 that may be used to walk memory page tables, according to embodiments. Address 250 is formatted for the four-level page table hierarchy 200 shown in the example of FIG. 2A.

Within address 250, an L3 page table number 252 selects a PTE in base page table 210 that points to an L3 page table 220. An L2 page table number 254 selects a PTE in an L3 page table 220 that points to one of L2 page tables 230. An L1 page table number 256 selects a PTE in an L2 page table 230 that points to one of L1 page tables 240. A page number 258 selects a PTE in an L1 page table 240 that contains a PPN or MPN corresponding to a 4-KB VM memory page. An offset 260 specifies a position within a selected 4-KB VM memory page. However, for example, in the case of a virtual memory space that is instead divided into 2-MB pages, the L1 page table number 256 may be eliminated, the page number 258 may select a PTE in an L2 page table 230 that contains a PPN or MPN corresponding to a 2-MB VM memory page, and the offset 260 may specify a position within a selected 2-MB VM memory page.

Figure 3A:
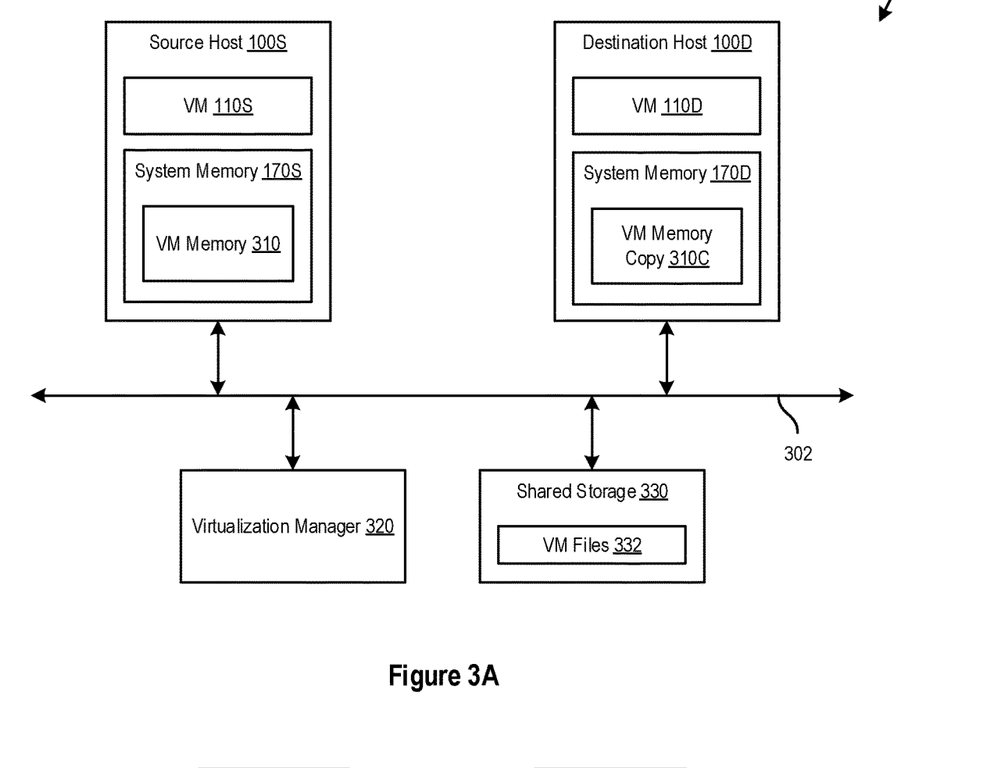
FIG. 3A is a block diagram of a virtualized computing system in which a VM may be migrated from a source host to a destination host, according to embodiments.

FIG. 3A is a block diagram of a virtualized computing system 300 in which a VM may be migrated from a source host 100S to a destination host 100D, according to embodiments. Host computer 100S includes a VM 110S and system memory 170S. VM 110S manages a portion of system memory 170S referred to as VM memory 310. Source host 100S is connected by a network 302 to a destination host 100D to which VM 110S is to be migrated. Network 302 may be, e.g., a physical network that enables communication between hosts 100S and 100D and between other components and hosts 100S and 100D.

Virtualized computing system 300 further includes a virtualization manager 320 and shared storage 330. Virtualization manager 320 performs administrative tasks such as managing hosts 100S and 100D, provisioning and managing VMs therein, migrating VM 110S from source host 100S to destination host 100D, and load balancing between hosts 100S and 100D. Virtualization manager 320 may be a computer program that resides and executes in a server or, in other embodiments, a VM executing in one of hosts 100S and 100D. One example of a virtualization manager 320 is the VMware vCenter Server® by VMware, Inc.

After migration of VM 110S from source host 100S to destination host 100D, VM 110S runs as VM 110D in destination host 100D. The image of VM 110D in system memory 170D is depicted as VM memory copy 310C, which is a copy of VM memory 310.

Shared storage 330 accessible by hosts 100S and 100D includes VM files 332, which include, e.g., application and guest OS files. Although the example of FIG. 3A includes VM files 332 in shared storage 330, the techniques described herein can also be employed in VM migrations in which each host accesses VM files on separate storage systems. In such an embodiment, VM files 332 are copied from a source storage system to a destination storage system.

Figure 3B:
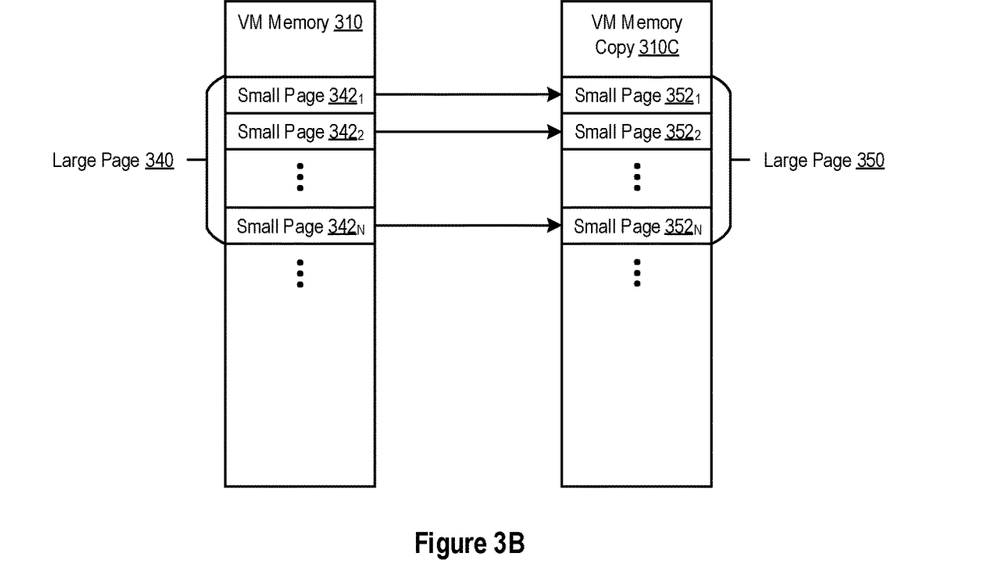
FIG. 3B is a block diagram illustrating the structure of a VM's memory at a source host before a migration and the structure of the VM's memory at a destination host after the migration, according to embodiments.

FIG. 3B is a block diagram illustrating the structure of VM memory 310 at source host 100S before a migration and the structure of VM memory copy 310C at destination host 100D after the migration, according to embodiments. As illustrated in FIG. 3B, when small pages 342 are copied from source host 100S to destination host 100D, the contents are stored in corresponding small pages 352. Small pages 342 and 352 are, e.g., contiguous 4-KB VM memory pages that form large pages 340 and 350, respectively. Large pages 340 and 350 are, e.g., 2-MB VM memory pages. Each small page 342 is stored at the same memory position relative to large page 340 as each small page 352 is stored relative to large page 350. Large pages 340 and 350 can thus be said to correspond to each other and to contain the same small pages. Such correspondence is desired to preserve all the large pages of VM memory 310 when VM memory 310 is copied from source host 100S to destination host 100D.

Figure 4:
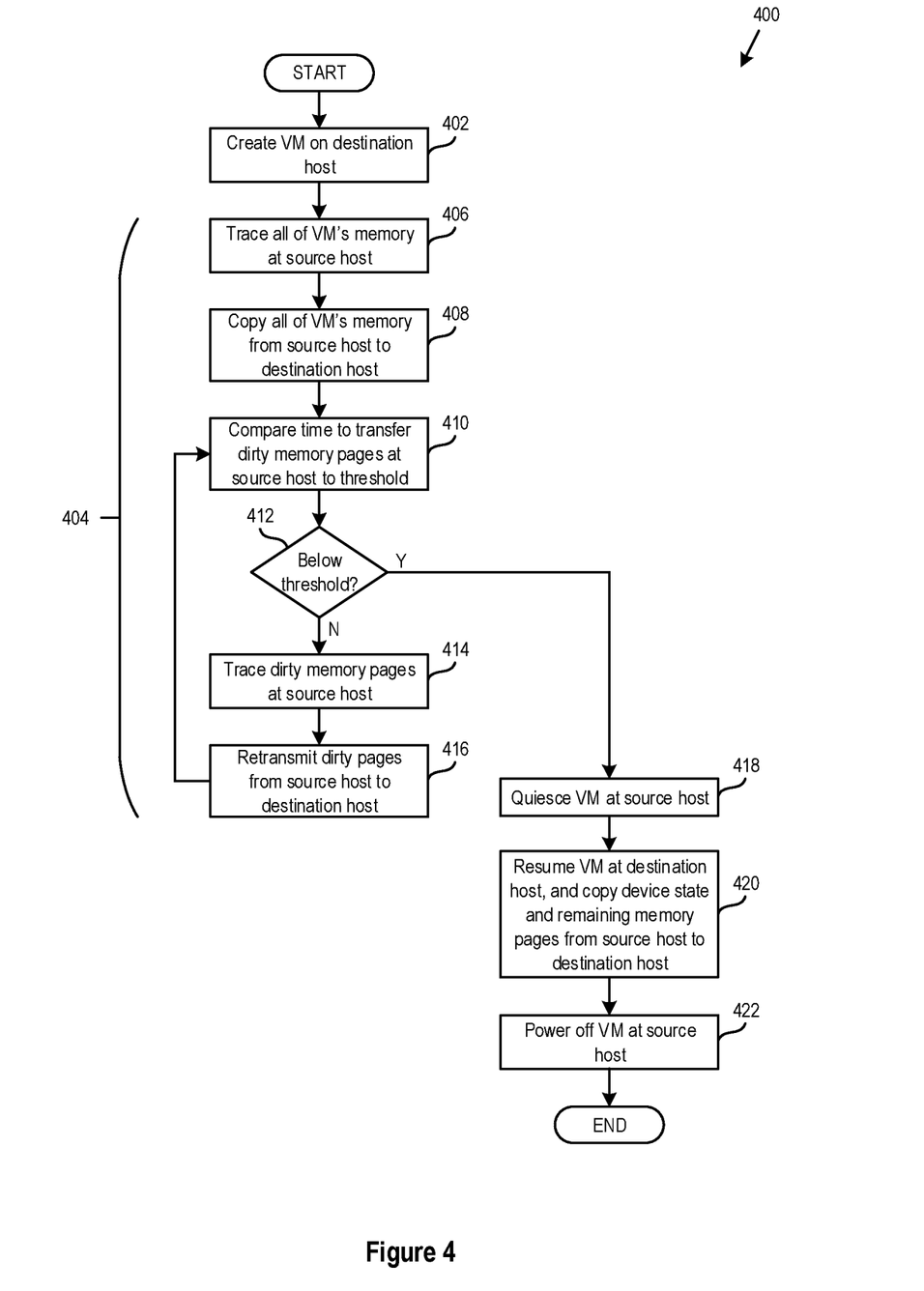
FIG. 4 is a flow diagram of steps carried out to perform a method of migrating a VM from a source host to a destination host, according to an embodiment.

FIG. 4 is a flow diagram of steps carried out to perform a method 400 of migrating a VM from a source host to a destination host, according to an embodiment. Method 400 will be explained with reference to source and destination hosts 100S and 100D of FIG. 3A. Method 400 can be performed through cooperation of VM migration modules 150 in hosts 100S and 100D, which are referred to generally herein as "VM migration software."

At step 402, the VM migration software creates a VM on destination host 100D, e.g., VM 110D. At this point in method 400, VM 110D is not started. At step 404, the VM migration software executes an iterative pre-copying of VM memory 310 from source host 100S to destination host 100D. The pre-copying spans steps 406-416. During the pre-copying phase, VM 110S continues executing at source host 100S and can modify memory pages that have already been copied to destination host 100D. The VM migration software tracks modified pages of VM memory 310 between iterations of pre-copying, such modified memory pages also referred to as "dirty" memory pages.

At step 406, the VM migration software installs "write traces" on all pages of VM memory 310 to track which memory pages are subsequently dirtied. There are various techniques for tracking and enforcing write traces. The installation of write traces is further described in U.S. patent application Ser. No. 17/002,233, filed Aug. 25, 2020, the entire contents of which are incorporated herein by reference. VMM 140 in source host 100S maintains metadata 144 which identify the pages of VM memory 310 that are being traced. When VM 110S writes to a traced memory page, the VM migration software is notified, which is referred to as a "trace fire," and the VM migration software tracks such pages as "dirty" in metadata 152. Alternative to write tracing, the VM migration software sets "read-only" flags in PTEs referencing pages of VM memory 310 to track which memory pages are subsequently dirtied. When VM 110S writes to any read-only page, a fault is triggered, and the fault handler notifies the VM migration software that the read-only page has been written to. In response, the VM migration software tracks such pages as "dirty" in metadata 152. At step 408, the VM migration software transmits all pages of VM memory 310 to destination host 100D along with PPNs of such pages and metadata indicating whether the pages are backed by large pages. VM memory 310 is transmitted in units of 4-KB pages, although larger page sizes can be used. When these pages are stored in destination host 100D, backing metadata 132 maintained in destination host 100D is updated with the PPN to MPN mappings for these pages and to set flags for those pages that are backed by large pages.

At step 410, the VM migration software accesses metadata 152 to determine how many pages of VM memory 310 have been dirtied since the last installation of write traces, e.g., while the pages were being transmitted to destination host 100D, and compares the amount of time it would take to retransmit these dirty pages to a defined threshold. The amount of time depends on both the total size of the dirty pages and the transmission bandwidth. At step 412, if the amount of time is below the threshold, method 400 moves to step 418. Otherwise, method 400 moves to step 414, and the VM migration software re-installs write traces on the dirty pages of VM memory 310. The VM migration software does not need to re-install write traces on the other pages of VM memory 310. At step 416, the VM migration software retransmits the dirty pages of VM memory 310 to destination host 100D along with PPNs of such pages. These pages are stored in destination host 100D at the same MPNs as in step 408.

After step 416, method 400 returns to step 410, and the VM migration software accesses metadata 152 to determine how many pages of VM memory 310 have been dirtied since the last installation of write traces (e.g., at step 414) and compares the amount of time it would take to retransmit these dirty pages to the defined threshold. Steps 414 and 416 are repeated for the dirty pages indicated in metadata 152 and the method loops back to step 410 if it is determined at step 412 that the amount of time it would take to retransmit these dirty pages is not below the threshold.

At step 418, the VM migration software begins the process of switching over VM 110S to VM 110D by "quiescing" VM 110S. At this point, VM 110S is no longer running and thus no longer modifying VM memory 310. At step 420, the VM is resumed as VM 110D, and the VM migration software transfers the device state of VM 110S from source host 100S to destination host 100D including the states of any virtual devices used by VM 110S. The VM migration software also transfers a final set of pages of VM memory 310 to destination host 100D along with the PPNs of such pages. These pages are stored in destination host 100D at the same MPNs as in step 408. The final set includes the pages of VM memory 310 that have been dirtied since the last installation of write traces (e.g., at step 414). Until these pages are copied over to destination host 100D, these pages are referred to herein as "remote" VM memory pages, and backing metadata 132 maintained in destination host 100D indicates that these pages are "remote" pages. After these pages are copied over, backing metadata 132 is updated to indicate that these pages are no longer "remote." After the final set of memory pages is copied and the device state of VM 110S is restored in VM 110D, VM 110D begins executing guest instructions. At step 422, the VM migration software powers off VM 110S in source host 100S. After step 422, method 400 ends, and VM 110D continues executing on destination host 100D.

Figure 5:
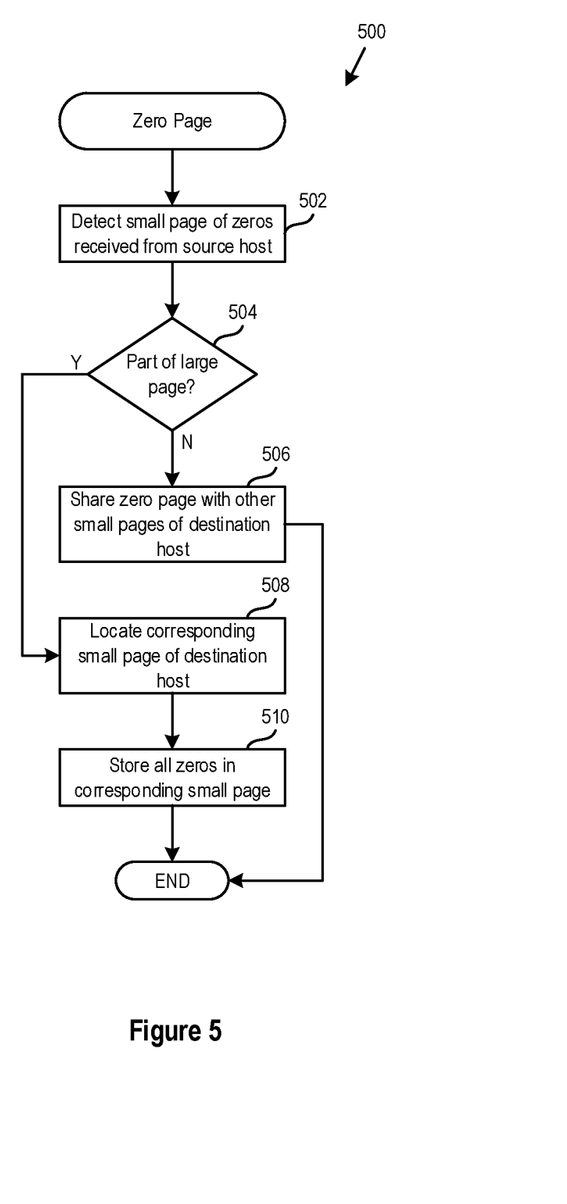
FIG. 5 is a flow diagram of steps carried out to perform a method of storing zeros in a small page of memory of a destination host during a VM migration, according to an embodiment.

FIG. 5 is a flow diagram of steps carried out by the VM migration software to perform a method 500 when the receipt of a zero page is detected at a destination host during VM migration, according to an embodiment. Method 500 will be explained with reference to source and destination hosts 100S and 100D of FIG. 3A.

Method 500 begins at step 502, where the VM migration software detects at destination host 100D that a small page of zeros, e.g., a 4-KB page storing only zeros, has been received from source host 100S. In some embodiments, to preserve bandwidth, the small page of zeros are not actually transmitted. Instead, only metadata indicating that the small page is a zero page is transmitted.

At step 504, the VM migration software determines whether, at source host 100S, the small page is backed by a large page, e.g., is part of a 2-MB page. For example, kernel 130 of destination host 100D may check backing metadata 132 for each migrated page indicating whether a migrated page is backed by a large page. This information may be transmitted as metadata along with the small pages to destination host 100D, e.g., during the first iteration of the pre-copying phase. If the detected small page is not part of a large page, method 500 moves to step 506, and the VM migration software maps the small page to an MPN containing all zeros at destination host 100D. After step 506, method 500 ends.

Returning to step 504, if the detected small page is part of a large page of memory, method 500 moves to step 508. At step 508, the VM migration software locates a small page in destination host 100D that corresponds to the detected small page of zeros. The VM migration software locates the small page by making a kernel call to check backing metadata 132 for the MPN corresponding to the PPN of the detected small page. At step 510, the VM migration software stores all zeros in the corresponding small page of destination host 100D. After step 510, method 500 ends.

Figure 6:
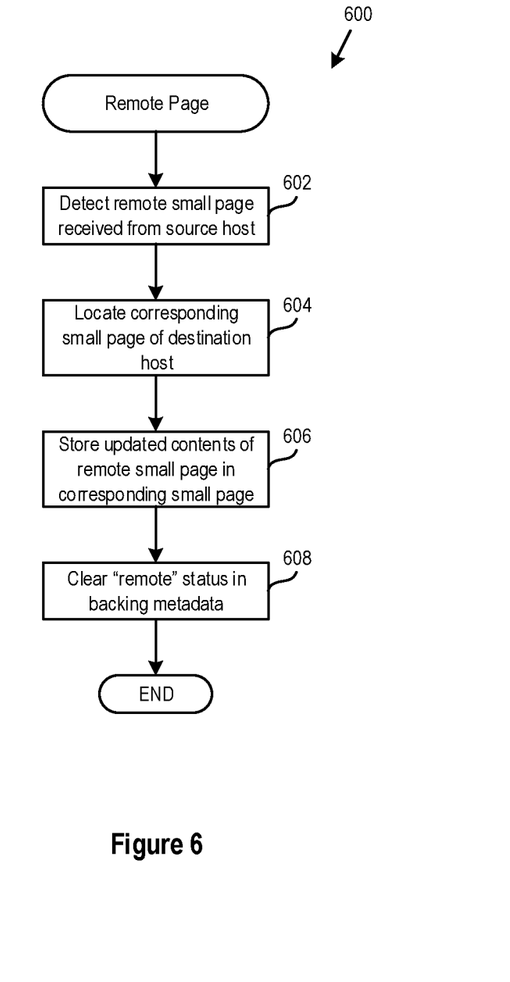
FIG. 6 is a flow diagram of steps carried out to perform a method of storing the updated contents of a remote small page of memory in a destination host during a VM migration, according to an embodiment.

FIG. 6 is a flow diagram of steps carried out by the VM migration software to perform a method 600 when the receipt of a remote small page of memory is detected at a destination host during VM migration, according to an embodiment. Method 600 will be explained with reference to source and destination hosts 100S and 100D of FIG. 3A.

Method 600 begins at step 602, where the VM migration software detects at destination host 100D, that a remote small page has been received from source host 100S. There are two operations that may result in such a detection: a "push" operation and a "pull" operation. With a push operation, the detected remote small page is copied from source host 100S after the pre-copying phase of a migration. The detected remote small page is thus copied along with the remaining dirty pages of the migration. With a pull operation, a migrated VM resumes and attempts to touch a remote page for which updated content has not yet been copied to destination host 100D, resulting in a "remote page fault." In response to the remote page fault, destination host 100D specifically requests the updated content of the remote page from source host 100S. Source host 100S then transmits the updated content to destination host 100D as the detected remote small page.

At step 604, the VM migration software locates an MPN of the small page in destination host 100D that corresponds to the detected remote small page, in which the update content of the remote small page will be stored. It should be noted herein that the MPN for the remote small page is not freed up, the MPN being either specific to the remote small page or part of a large page. The VM migration software locates the small page by making a kernel call to check backing metadata 132 for the MPN corresponding to the PPN of the detected remote small page. At step 606, the VM migration software stores the updated contents of the remote small page in the MPN corresponding to the remote small page. At step 608, the VM migration software makes a kernel call to clear the "remote" status of the detected remote small page in kernel metadata 132. The kernel 130 of destination host 100D then clears the "remote" status, and method 600 ends.

In the embodiments described above, destination host 100D determines that small pages are backed by large pages by checking the metadata transmitted by source host 100S and stored in backing metadata 132. In alternative embodiments, destination host 100D determines that small pages are backed by large pages by checking nested page tables 142 of the migrated VM. For example, if bottom level page tables reference a 2-MB page, then it is determined that small pages that are part of this 2-MB pages are backed by a large page.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of preserving contiguity of large pages of a workload during migration of the workload from a source host to a destination host, the method comprising:
receiving from the source host at a first time, a first small page of the workload, wherein in system memory of the source host, the first small page is part of a first large page of the workload;
receiving from the source host at a second time after the first time, the first small page, wherein previous contents of the first small page have been modified since the receiving of the first small page at the first time; and
in response to the receiving of the first small page at the second time, storing, in system memory of the destination host, the modified contents of the first small page in a second small page of the workload, wherein the second small page is part of a second large page of the workload.

2. The method of claim 1, wherein a location in the system memory of the source host, of the first small page relative to the first large page, is the same as a location in the system memory of the destination host, of the second small page relative to the second large page.

3. The method of claim 2, wherein the source host detected the modified contents of the first small page based on a write trace installed on the first small page.

4. The method of claim 2, wherein the workload is a virtual machine (VM), and the migration of the VM comprises quiescing the VM at the source host and resuming the VM at the destination host.

5. The method of claim 4, wherein the second time is after the resuming of the VM at the destination host.

6. The method of claim 5, further comprising:
in response to the receiving of the first small page at the first time, and before the second time, storing the previous contents of the first small page in the second small page.

7. The method of claim 6, further comprising:
after the storing of the previous contents of the first small page, and before the second time, storing metadata at the destination host, wherein the metadata indicates that the second small page is remote.

8. A non-transitory computer-readable medium comprising instructions that are executable by a destination host, wherein the instructions when executed cause the destination host to carry out a method of preserving contiguity of large pages of a workload during migration of the workload from a source host to the destination host, the method comprising:
receiving from the source host at a first time, a first small page of the workload, wherein in system memory of the source host, the first small page is part of a first large page of the workload;
receiving from the source host at a second time after the first time, the first small page, wherein previous contents of the first small page have been modified since the receiving of the first small page at the first time; and
in response to the receiving of the first small page at the second time, storing, in system memory of the destination host, the modified contents of the first small page in a second small page of the workload, wherein the second small page is part of a second large page of the workload.

9. The non-transitory computer-readable medium of claim 8, wherein a location in the system memory of the source host, of the first small page relative to the first large page, is the same as a location in the system memory of the destination host, of the second small page relative to the second large page.

10. The non-transitory computer-readable medium of claim 9, wherein the source host detected the modified contents of the first small page based on a write trace installed on the first small page.

11. The non-transitory computer-readable medium of claim 9, wherein the workload is a virtual machine (VM), and the migration of the VM comprises quiescing the VM at the source host and resuming the VM at the destination host.

12. The non-transitory computer-readable medium of claim 11, wherein the second time is after the resuming of the VM at the destination host.

13. The non-transitory computer-readable medium of claim 12, the method further comprising:
in response to the receiving of the first small page at the first time, and before the second time, storing the previous contents of the first small page in the second small page.

14. The non-transitory computer-readable medium of claim 13, the method further comprising:
after the storing of the previous contents of the first small page, and before the second time, storing metadata at the destination host, wherein the metadata indicates that the second small page is remote.

15. A computer system comprising:
a source host comprising system memory; and
a destination host comprising system memory, wherein the destination host is configured to:
receive from the source host at a first time, a first small page of a workload, wherein in the system memory of the source host, the first small page is part of a first large page of the workload;
receive from the source host at a second time after the first time, the first small page, wherein previous contents of the first small page have been modified since the receiving of the first small page at the first time; and
in response to the receiving of the first small page at the second time, store, in the system memory of the destination host, the modified contents of the first small page in a second small page of the workload, wherein the second small page is part of a second large page of the workload.

16. The computer system of claim 15, wherein a location in the system memory of the source host, of the first small page relative to the first large page, is the same as a location in the system memory of the destination host, of the second small page relative to the second large page.

17. The computer system of claim 16, wherein the source host is configured to:
detect the modified contents of the first small page based on a write trace installed on the first small page.

18. The computer system of claim 16, wherein the workload is a virtual machine (VM), and to migrate the VM from the source host to the destination host, the source host is configured to quiesce the VM, and the destination host is further configured to resume the VM.

19. The computer system of claim 18, wherein the second time is after the resuming of the VM by the destination host.

20. The computer system of claim 19, wherein the destination host is further configured to:
in response to the receiving of the first small page at the first time, and before the second time, store the previous contents of the first small page in the second small page; and
after the storing of the previous contents of the first small page, and before the second time, store metadata indicating that the second small page is remote.

* * * * *